United States Patent Office 3,190,862
Patented June 22, 1965

---

3,190,862
COPOLYMERS OF ETHYLENE AND METHYL SUBSTITUTED α,ω-DIOLEFINS
Luigi Boghetich, Texas City, and Raymond H. Reinhard, Galveston, Tex., assignors to Monsanto Company, a corporation of Delaware
No Drawing. Filed May 24, 1961, Ser. No. 112,232
1 Claim. (Cl. 260—88.2)

This invention relates to novel hydrocarbon polymers and in particular, to copolymers of ethylene and methyl substituted α,ω-diolefins.

High-molecular-weight, solid ethylene polymers have been known in the art for a considerable length of time. These polymers, though useful for many purposes, have a major drawback. When combining the desirable properties of flexibility and toughness, the polymer exhibits undesirable stress crack resistance which is not nearly satisfactory in most applications.

When high molecular weight polyethylenes are exposed to mobile polar liquids such as alcohols, esters, ethers, and ketones, sudden cracks are caused after a given length of time if the piece has internal strains without any measurable swelling effect. This phenomenon is referred to as stress cracking or environmental cracking.

The degree of crystallinity somewhat affects the readiness of polyethylene to crack. That is, samples which are slowly cooled and annealed are somewhat inferior in crack resistance to rapidly cooled and quenched samples. When the resin is cooled slowly from the melt, a greater degree of crystallinity results and the product is noticeably stiffer. This would introduce higher stresses which explains at least partially the greater tendency for the annealed specimens to crack.

It is also generally believed that the higher the molecular weight of a polyethylene, the more resistant it becomes to cracking.

The stress cracking problem in polyethylene can be solved in many cases by increasing the molecular weight or by adding other materials, such as polyisobutylene, butyl rubber, or polypropylene. It has been a goal for many years to prepare high molecular weight ethylene polymers which combine toughness with flexibility and which have strong resistance to stress cracking.

It is, therefore, the object of the present invention to prepare novel, solid ethylene-based polymers. A further object is to prepare solid copolymers of ethylene and methyl substituted α,ω-diolefins having from 7 to 14 carbon atoms. An object of the invention is also to prepare solid copolymers of ethylene and dimethylpentadiene. Another object is to prepare solid hydrocarbon polymers which combine toughness and flexibility and exhibit strong resistance to stress cracking. These and other objects of the invention will become apparent from the following description.

According to the present invention, highly useful hydrocarbon resins are obtained when methyl substituted α,ω-diolefins having from 7 to 14 carbon atoms and having no allylic, transferable hydrogens are copolymerized with ethylene at elevated temperatures and pressures and in the presence of a free-radical-type initiator.

One composition which represents the embodiment of the present invention is the high molecular weight copolymer of ethylene and 3,3-dimethylpentadiene-1,4, having the general formula:

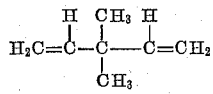

This copolymer has a combination of flexibility and toughness combined with high resistance to stress cracking. This is the particular advantage of the composition.

Copolymers of ethylene and methyl substituted α,ω-diolefins, and particularly the copolymer of ethylene and dimethylpentadiene, are controlled crosslinked polymers with modified crystallinity properties. The methyl substituted α,ω-diolefin component decreases the size of the crystals and the amount of crystallinity and increases or maintains a high molecular weight without increasing crystallinity.

The invention is illustrated by the following examples but they should not be construed as limiting it in any manner.

Example 1

A copolymer of ethylene and 3,3-dimethylpentadiene-1,4 was prepared by polymerizing ethylene and dimethylpentadiene together in a 242 cc. bomb. In carrying out the polymerization 2.8 cc. of liquid dimethylpentadiene, 8.2 cc. of acetone to act as a modifier, and 0.1 cc. of 0.5 molar in benzene solution of ditertiary-butyl peroxide were introduced into an internal compartment of the bomb. This amount of dimethylpentadiene represents 0.5 mol percent of the ethylene feed. The bomb was pressured with pure ethylene to 7500 p.s.i. to 130° C. through a top entry. The ethylene feed was then switched so that it flowed into the bomb through the compartment containing the dimethylpentadiene, acetone, and ditertiary-butyl peroxide until the bomb pressure reached 20,000 p.s.i. while maintaining the temperature at 130° C. The bomb was then agitated mechanically by an internal agitator for 88 minutes. At the end of that period of time, the pressure was released and the product obtained was 22.35 grams of an ethylene-dimethylpentadiene copolymer having a melt index of 0.2. The conversion was calculated to be 18.8 percent.

The copolymer obtained from the polymerization was molded into a slab 4 inch x ⅛ inch thick by means of a mechanical press under 2000 p.s.i. and at 160 to 165° C. for 5 minutes. At that time, the molding was completed and the pressure on the mold was increased to 30,000 p.s.i. with no heat applied. When the temperature fell below 160° C., water was circulated through a cooling jacket in the frame of the press. When the temperature reached 130° C., the cooling water was shut off. The temperature continued to fall and when it reached 120° C., the pressure on the slab was increased to 40,000 p.s.i. When the temperature reached 95° C., the cooling water was again circulated. This was continued until the temperature reached 35 to 40° C. The pressure was then released and the slab removed.

Ten specimens, each 1½" x ½" were cut from the 4" by 4" slab. A controlled imperfection was then given to each specimen on one surface. The ten specimens were bent into 180° positions and placed in a special channel or holder which was then lowered into a solution of 20% Hostapal and 80% water at a temperature of 50° C. Hostapal is a detergent manufactured by Hoechst of Germany. The procedure used is described by the ASTM standards for plastics, D1693–59 T (1959). The elapsed time until the first sample showed an environmental crack was measured. This was recorded as the 10% failure point. The time was also noted when each of the other 9 samples failed by cracking across the bent surface. The time that the tenth sample showed an environmental crack was recorded is the 100% failure level. The elapsed time for a 50% failure was determined by plotting the best straight line through all of the points of time vs. failure for each of the 10 samples. The 50% failure was then read from the straight line drawn through the points to the elapsed time on the abscissa of the plot. The 50% failure for the ethylene dimethylpentadiene copolymer was determined to be 310 minutes. The flexibility and toughness was found to be the same as a pure polyethylene polymerized in the same manner as this copolymer.

Example II

Ethylene was polymerized in the bomb described in Example I under the identical conditions as described in Example I except that no dimethylpentadiene was added to the compartment of the bomb to copolymerize with the ethylene. After a period of 91 minutes in the bomb, 15.37 grams of polyethylene having a melt index of 0.13 was obtained.

This material was subjected to the thermal treatment in the press in exactly the same manner as the ethylene-dimethylpentadiene copolymer in Example I and the environmental stress cracking test was conducted in an identical manner as that of Example 1. The 50% failure was determined to be 215 minutes, by reading from the 50% failure to the corresponding time on the best straight line plotted through all of the failure points.

It is apparent from the foregoing examples that copolymers of ethylene and methyl substituted $\alpha,\omega$-diolefins, such as 3,3-dimethylpentadiene-1,4, are superior in stress crack resistance to polymers of pure ethylene while still exhibiting the desirable characteristics of polyethylene, that is, flexibility and toughness.

Besides dimethylpentadiene, other methyl substituted $\alpha,\omega$-diolefins which will successfully copolymerize with ethylene to produce copolymers having improved stress-crack resistance are other methyl substituted $\alpha,\omega$-diolefins having no allylic, transferable hydrogens, such as 3,3,4,4-tetramethylhexadiene-1,5; 3,3,5,5-tetramethylheptadiene-1,6; and 3,3,6,6-tetramethyloctadiene-1,7.

The copolymers of this invention may be fabricated into articles, films, and fibers. They may be blended with other thermoplastic polymers. Fillers, reinforcing agents, such as fibrous materials, and foaming agents may be added to the copolymers to serve particular applicants. The properties of the copolymers may further be improved by the addition of stabilizing agents and pigments may be added to obtain colored compositions.

The copolymers of the present invention are useful in a large number of applications, particularly those which require a material of great stress crack resistance as in many molding uses and electrical wire insulations, and a material with a high degree of flexibility and toughness as in film applications.

The quantity of the methyl substituted $\alpha,\omega$-diolefins to be introduced into the polymerization reaction can be in the range from about 0.1 mol percent to 10 mol percent based on the total mols of the ethylene feed stream. However, the preferred amount of methyl substituted $\alpha,\omega$-diolefin to be added to the ethylene is in the range from about 0.5 mol percent to about 5 mol percent of the ethylene introduced.

The catalysts which may be employed in the process to make the instant copolymer comprise those free-radical initiators which catalyze the polymerization of ethylene. These substances include oxygen; organic peroxides, such as peracetic acid, diacetyl peroxide, benzyl peroxide, tertiary butyl perbenzoate, di-tertiary butyl peroxide, and tertiary butyl hydroperoxide; and azo compounds.

This process may be carried out in either a batch or continuous type operation. The preferred method, however, is of the continuous type wherein the ethylene, methyl substituted $\alpha,\omega$-diolefin, catalyst, and any desired modifier are charged to a reactor maintained under suitable conditions of temperature and pressure. The polymer in this operation is separated from the reactor effluent continuously and the unreacted ethylene, methyl substituted $\alpha,\omega$-diolefin and modifier, if any, are recycled to the reaction zone.

The pressure at which the coplymers of the invention can be successfully produced is in the range from about 5000 p.s.i. to about 50,000 p.s.i. although the preferred range is from about 15,000 p.s.i. to about 40,000 p.s.i. The temperature required for the polymerization may likewise be varied over a wide range from about 100° C. to about 400° C. with the range from about 150° C. to about 300° C. being preferred.

Any modifier or chain transfer agent may be used in conjunction with the manufacture of this copolymer if certain polymer properties are desired which a modifier or chain-transfer agent may impart. Some well known modifiers which can be used are propane, propylene, benzene, cyclohexane, hydrogen, and carbon dioxide. However, no modifier is required to produce the composition claimed in this invention and only if unique modifier induced properties are needed, is one necessary.

What is claimed is:

A copolymer composition produced by copolymerizing ethylene and from 0.1 mol percent to 10 mol percent based on the ethylene fed of a methyl substituted $\alpha,\omega$-diolefin chosen from the group consisting of 3,3-dimethylpentadiene-1,4; 3,3,4,4-tetramethylhexadiene-1,5; 3,3,5,5-tetramethylheptadiene-1,6; and 3,3,6,6-tetramethyloctadiene-1,7 at a pressure from about 5,000 to about 50,000 p.s.i. and a temperature from about 100° C. to about 400° C. in the presence of a free radical catalyst to initiate the polymerization.

References Cited by the Examiner

UNITED STATES PATENTS

| | | | |
|---|---|---|---|
| 2,396,785 | 3/41 | Hanford | 260—94.9 |
| 2,915,516 | 12/59 | Juveland et al. | 260—94.9 |
| 2,930,781 | 3/60 | Schmerling | 260—85.3 |
| 2,962,488 | 11/60 | Horne | 260—94.7 |

FOREIGN PATENTS

| | | |
|---|---|---|
| 573,755 | 4/59 | Canada. |
| 865,743 | 4/61 | Great Britain. |

JOSEPH L. SHOFER, *Primary Examiner.*

L. H. GASTON, WILLIAM H. SHORT, *Examiners.*